Aug. 23, 1966 J. M. LINKE 3,268,836

TRANSVERSAL FILTER FOR CORRECTING OR SYNTHESIZING ECHOES ACCOMPANYING UNIDIRECTIONAL PRINCIPAL PULSE, INCLUDING AUTOMATIC MEANS PREVENTING UNIDIRECTIONAL BIAS OF OUTPUT TRANSFORMER CORE

Filed Sept. 23, 1963 2 Sheets-Sheet 1

JOSEF M. LINKE
INVENTOR

BY Hall & Houghton
ATTORNEY

JOSEF M. LINKE,
INVENTOR.
BY Hall & Houghton
ATTORNEY.

3,268,836

TRANSVERSAL FILTER FOR CORRECTING OR SYNTHESIZING ECHOES ACCOMPANYING UNIDIRECTIONAL PRINCIPAL PULSE, INCLUDING AUTOMATIC MEANS PREVENTING UNIDIRECTIONAL BIAS OF OUTPUT TRANSFORMER CORE

Josef Maria Linke, Bushey Heath, England, assignor to Her Majesty's Postmaster General, London, England Filed Sept. 23, 1963, Ser. No. 310,616
11 Claims. (Cl. 333—20)

This invention relates to the correction or synthesis of electrical waveforms. It relates to a method of correction or synthesis of an electrical waveform and also to an echo waveform corrector or synthesiser for effecting that method.

If an electrical transmission system has an upper frequency limit, any arbitrary transmission characteristic may be produced by adjusting the time response of the system at intervals not exceeding the half-period of the limiting frequency. This may be done by combining a signal being transmitted with a series of advanced or retarded replicas, or "echoes," each having a suitable amplitude and polarity with respect to the signal being transmitted. A device which provides such facilities over a limited range of time is commonly known as an echo waveform corrector, or echo waveform synthesiser, depending on the application of the device. Transversal correctors are known, in which the input signal travels along a delay line towards a termination of high return loss and outputs are derived from tappings along the line. The main signal output is tapped off near the centre of the line and the other tappings supply the echoes which are adjustable in amplitude and can be inverted in sign by differential amplifiers. Such amplifiers are relatively complex and efforts have been made to devise arrangements in which the use of such amplifiers can be avoided. One solution of the problem has been proposed in United States patent specification No. 2,935,703, which describes a circuit which is not of the transversal type and which uses "doublet" echoes. Correctors of this type have been used successfully in the field but they are not so easy to adjust as are transversal correctors.

It is an object of this invention to provide an improved method of correcting or synthesizing an electrical waveform using echo waveform techniques and to provide apparatus for carrying out that method.

According to the present invention, a method of correcting or synthesizing an electrical waveform comprises feeding a signal input to signal transmission delay means, deriving from the delay means a main signal output, deriving from the delay means desired amplitude replicas of the signal input, respective replicas being non-coincident in time with the main signal output, feeding the replicas to a cored transformer for combination with the main signal output, and applying to the transformer a replica of the signal input, or the equivalent thereof, coincident in time with the main signal output and of such magnitude and sense that all the replica signals together produce no direct current magnetisation of the transformer core.

The individual replicas of the signal input non-coincident in time with the main signal output may be combined subtractively or additively with the main signal output, i.e. the replicas may have the same polarity as or be of opposite polarity to the main signal output.

The replica of the signal input coincident in time with the main signal output may be derived directly from the delay means or, alternatively, may be derived from the main signal output itself.

An electrical echo waveform corrector or synthesizer, in accordance with the invention, may include signal transmission delay means, a signal input terminal connected to the device, an output terminal, first means for deriving a main signal output from the signal input terminal and connected to apply the main signal output to the output terminal, second means coupled to the delay means for deriving from the delay means desired amplitude replicas of the signal input and non-coincident in time with the main signal output, means for applying the said replicas to a cored transformer connected to the output terminal, and third means for applying to the transformer a desired amplitude replica of the signal input coincident in time with the main signal output, the second means and the third means being adjustable to cause individual replicas to be additively or subtractively combined with the main signal output at the output terminal.

Conveniently, the second means may be arranged to derive from the delay means replicas of the signal input having delays greater than that of the main signal output and also replicas of the signal input having delays less than that of the main signal output.

The main signal output and the replicas of the signal input may all be derived from a common delay line. Alternatively, the main signal output may be derived from one delay line and some or all of the replica signals derived from one or more separate delay lines.

The transformer may be a tapped choke, the tapping ratio being determined by the ratio of the load to the balancing resistor, the tapping being at the centre of the winding if those two resistors are equal. Conveniently, however, the transformer may have first and second windings, the second means being connected to the first winding and the first means connected to a tap on the second winding, one end of which is connected to the output terminal and the other end connected to ground by a balancing resistor. The third means may be means coupled to the delay line for deriving a replica of the input signal coincident in time with the main signal output and then is connected to the choke or the first winding of the transformer. Alternatively, when a transformer having two windings is used, the replica signal coincident in time with the main signal output may be provided by connecting the said other end of the second winding to ground by a variable resistor, so that an unbalanced condition can be obtained.

Means may be provided for controlling automatically the amplitude and sense of the replica of the signal input coincident in time with the main signal output in such manner that all the replicas of the signal input together produce zero direct current magnetization of the transformer core.

Embodiments of the invention will be described in greater detail, by way of example, with reference to the accompanying drawings, in which.

Figure 1:
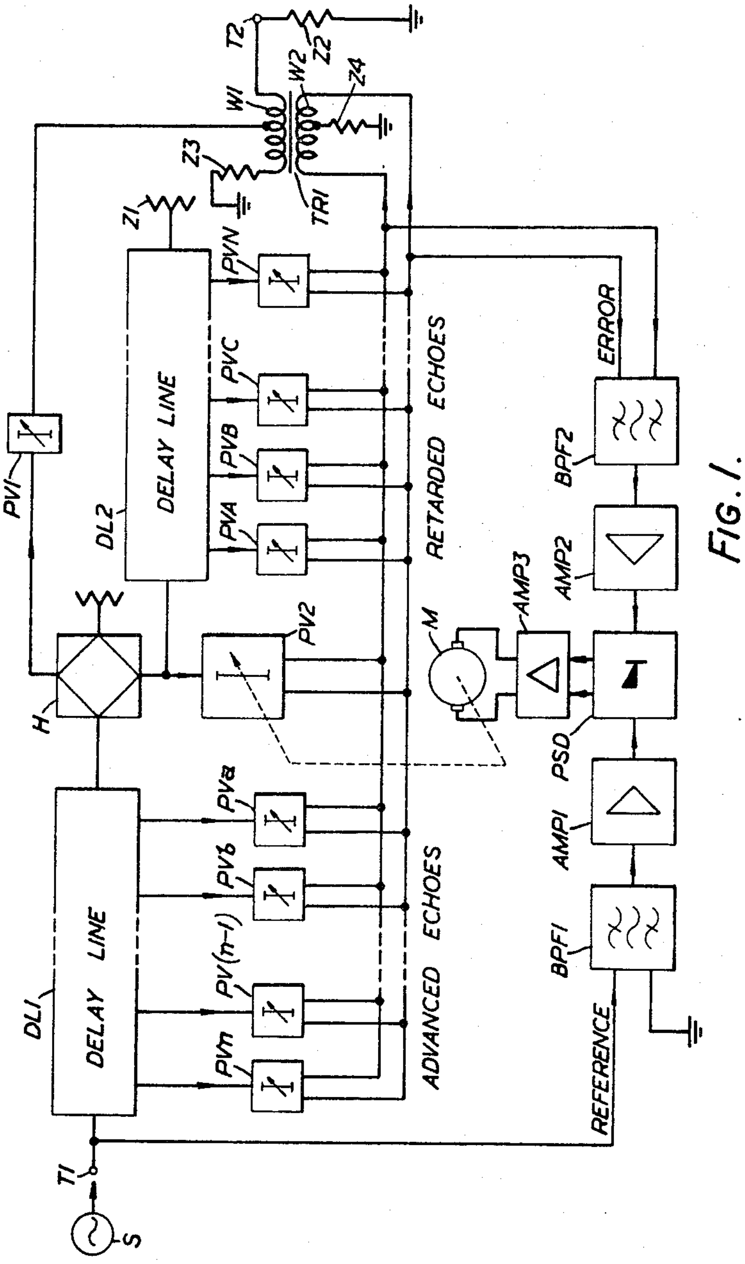
FIG. 1 shows schematically an echo waveform apparatus embodying the invention.

In FIG. 1, an input terminal T1 is arranged for connection to a signal source S. For the apparatus shown in FIG. 1 to be used as an echo waveform corrector, the source S provides an input signal whose waveform is to be corrected; for the apparatus to be used as an echo waveform synthesiser the source S provides an input signal from which the waveform is to be built up.

The input terminal T1 is connected to the input of a delay line comprising a first portion DL1 and a second portion DL2. The portions DL1 and DL2 are connected together by a hybrid H and an impedance Z1 provides a high return loss termination for the delay line.

The apparatus shown in FIG. 1 has an output terminal T2 connected to a load impedance Z2 and also to one end of a winding W1 of a transformer TR1. The other end of the winding W1 is connected to earth by a balancing impedance Z3. The transformer TR1 also has a further winding W2.

An output from the hybrid H is connected by a variable attenuator PV1 to a tap on the winding W1, and thence to the output terminal T2. The signal from this output will be referred to as the main signal output and it will be appreciated that this output is delayed in time with respect to the signal input. The tapping point on the winding W1 will be determined by the ratio of the load impedance Z2 to the balancing impedance Z3 and will be at the centre of the winding of the impedances Z2 and Z3 are equal.

Variable amplitude controlling means, shown as attenuators PV*a* . . . PV*n*, are electrically connected to the delay line portion DL1 at suitable spaced apart locations. The outputs from the attenuators PV*a* . . . PV*n* are connected across the winding W2 of the transformer TR1. The outputs from attenuators PV*a* . . . PV*n* are delayed replicas, or echoes, of the signal input to the delay line and the magnitudes of the echoes may be varied by adjustment of the appropriate ones of the attenuators PV*a* . . . PV*n*. The outputs of the attenuators PV*a* . . . PV*n* will be advanced in time relative to the main signal output from the hybrid H.

Further variable amplitude controlling means, shown as attenuators PVA . . . PVN are electrically connected to the deay line portion DL2 at suitable spaced apart locations to provide outputs, which are replicas, or echoes, of the signal input to the delay line, at times retarded with respect to the main signal output derived from the hybrid H. The magnitudes of the retarded echoes may be varied by adjustment of the attenuation of the appropriate attenuators PVA . . . PVN. The outputs of the attenuators PVA . . . PVN also are connected across the winding W2 of the transformer TR1.

The attenuators PV*a* . . . PV*n* and PVA . . . PVN are connected to the winding W2 so that the outputs of the respective attenuators can produce, at the output terminal, echo signals having eiher the same polarity as (additive replicas) or the opposite polarity to (subtractive replicas), that of the main signal output, as will be explained in greater detail with reference to FIG. 2. The winding W2 has a grounded tap, the connection may be direct or through a suitable impedance Z4 in order to decouple the opposite polarity outputs of the variable attenuators from each other.

The hybrid H has another output which is connected to a variable amplitude control shown as an attenuator PV2, the output from which (a delayed replica, or echo, of the signal input coincident in time with the main signal output), is connected to the winding W2. The magnitude of the output from the attenuator PV2 can be varied by adjustment of the attenuation of PV2 and is connected to winding W2 so that it can produce at the output terminal a signal having either the same polarity as, or the opposite polarity to, that of the main signal output, as desired.

Conveniently, the attenuators PV*a* . . . PV*n*, PVA . . . PVN and PV2 may comprise potentiometers, the ends of which are connected across the winding W2 of transformer TR1, the sliders of the potentiometers receiving an input from the delay line via series resistors. Thus when the slider of a potentiometer is at one end of its travel, the replica signal derived from the delay line is connected with small attenuation to one end of winding W2 and when the slider is at the other end of its travel, the signal is connected with small attenuation to the other end of winding W2. When the slider is at an intermediate position the signal is connected with greater attenuation to one end than the other end of winding W2 so that the resultant signal fed from this potentiometer to winding W2 has a magnitude and sense dependent on the position of the slider. When the slider is in the central position the resultant signal fed to the winding W2 is zero. Thus, the magnitude of the signal applied by a particular potentiometer across the winding W2 may be varied and also the sense of the signal from the potentiometer may be either one of two opposite senses to provide at the output terminal T2 a signal additive or subtractive with respect to the output from the hybrid H.

Consider the operation of the apparatus, as so far described, in correcting the waveform of a signal input from the source S and applied to the input terminal T1. There will be produced a main signal output originating from the attenuator PV1, and in FIG. 2*a* this output signal is represented as having a magnitude of +10 arbitrary units and occurring at a reference time which will be referred to as zero-time.

The otuput signal appearing across the load impedance Z2 may be displayed by, for example, an oscilloscope. In order to correct the shape of the signal input waveform it will be assumed that echoes advanced in time, with respect to the zero-time, are required from attenuators PV*a*, PV*b* and PV*n*–1, which have magnitudes of −3, +5 and −1 arbitrary units respectively, and that echoes retarded in time, with respect to zero-time, are required from attenuators PVB, PVC and PVN which have magnitudes +2, +3 and −4 abritrary units respectively. The echo or replica signals from the attenuators PV*b*, PVB and PVC thus have the same polarity as the output from the attenuator PV1 (additive replicas) whilst the echo or replica signals from the attenuators PV*a*, PV*n*–1 and PVN have opposite polarity to the output from the attenuator PV1 (subtractive replicas). These echo signals are represented as a time series in FIG. 2*b*.

In order, in accordance with the invention, that the echo signals produce zero direct current magnetization of the core of the transformer, TR1, it is arranged that the variable attenuator PV2 applies, at zero-time, to the winding W2 a signal to produce in the winding W1 a signal of magnitude and polarity −2 arbitrary units (i.e. a subtractive replica). The resultant output across the load impedance Z2 is represented by the array of echo signals and main signal, shown as a time series in FIG. 2*c*. It will be appreciated that the algebraic sum of all the echo signals, including that one occurring at zero-time, is zero. Thus, neither the main signal output from the attenuator PV1 nor the echo signals produce a zero frequency magnetizing current in the core of the transformer TR1.

Figure 2:
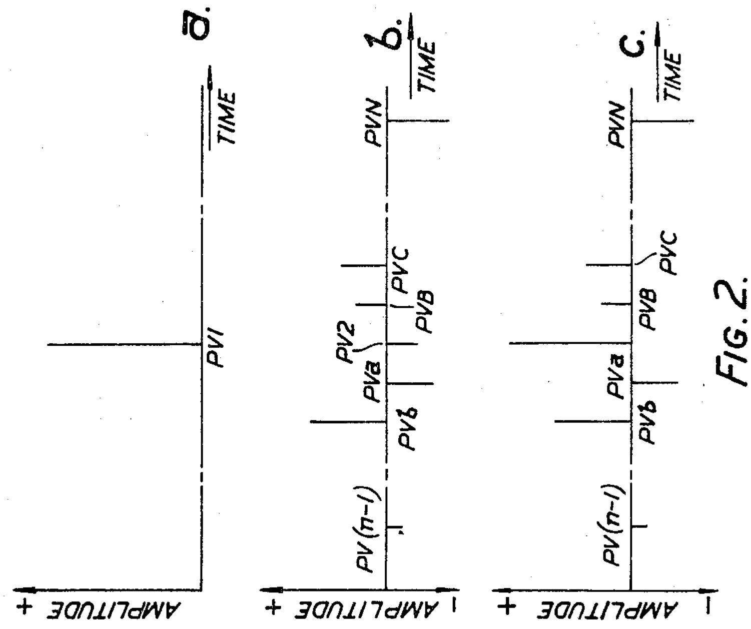
FIG. 2 shows a typical echo pattern in the form of a time series.

It will be appreciated that the main signal and echo array described in relation to FIG. 2 is only illustrative and that different magnitudes and polarities of echo signals may be required to correct the waveform of a signal input to the apparatus. Further, it will be appreciated that the zero-time echo may be needed to have the same polarity as the main signal output (i.e. an additive replica) in order for the algebraic sum of all the echo signals to be zero.

The apparatus described with reference to FIG. 2 may be used to remove linear distortion of a signal transmitted by a television network. It is a passive apparatus and has no electronic apparatus in any of the several signal paths existing within it. Problems arising from variations of gain and variations of linearity with age which are typical of electronic devices do not arise. Losses in the apparatus can be made good by orthodox amplifiers external to the apparatus These can be straightforward video amplifiers in which a high degree of negative feedback can be employed. In a typical television system, the transmitted signal has a spectrum which spans approximately 16 octaves and thus individual echoes produced from the transmitted signal by the apparatus described above have a similar spectrum. However, the combined array of echoes has a spectrum which differs from that of the transmitted signal and by arranging that the algebraic sum of the constituent echoes of the array is zero, no zero frequency energy is transmitted by the echo path. Further, the low frequency content of such an echo array is sufficiently small to permit transmission of the array via a transformer. It has been found, by tests using the apparatus described above, that in general the distortion due to the transformer is reduced to a negligible level if the ratio of the time constant associated with the transformer TR1 to the time range occupied by the assembled echo array is about 5:1.

In use of the apparatus described with reference to FIG. 1 for correction of a television transmission network, a signal source which produces a "pulse-and-bar" waveform may be fed as an input to the transmission network whose output is connected to the terminal T1 of the apparatus shown in FIG. 1. The output from terminal T2 is displayed by an oscilloscope. A suitable "pulse-and-bar" waveform is disclosed in Proceedings of the Institute of Electrical Engineers, volume 105, Part B, in an article by I. F. MacDiarmid and B. Phillips commencing at page 440. Echoes of the transmitted signal can be added to the signal by appropriate adjustment of particular ones of the variable attenuators PV*a* . . . PV*n* and PVA . . . PVN until the required display is obtained on the oscilloscope. If the algebraic sum of the constituent echoes of the echo array is not zero, this will be indicated by sloping of the displayed "bar" signal and in order to obtain a zero sum, the output of the variable attenuator PV2 is adjusted in magnitude and polarity until the slope is removed. It will be appreciated that manual adjustment of the attenuator PV2, each time an echo is added or removed or its magnitude changed, would be tedious. Accordingly, means for automatically maintaining the algebraic sum of the echo array at zero may be provided and one suitable means to achieve this end is shown in FIG. 1 and will be described below.

Generally, the phase shift between the constituent echoes of an echo array is quite small at relatively low frequencies and an error signal can conveniently be derived from the potential difference across either of the windings W1 or W2 of the transformer TR1 or across a further winding on the transformer. Television signals generally, and particularly a "pulse-and-bar" test signal as referred to above, have considerable energy content at the line-repetition frequency (approximately 16 kc./s. for a 625-line television system) and this frequency is sufficiently low to provide a suitable error signal although the field repetition signal or an external pilot signal having a suitable frequency could be used. The potential difference across windings W1 or W2, or a further winding, can, for any array of echoes, be zero only at zero frequency but the low frequency components of such an array give rise to a pronounced minimum potential difference when the algebraic sum of the magnitudes of the constituents is zero.

In FIG. 1, the variable attenuator PV2 is arranged to be controlled by a D.C. motor M so that the output of the attenuator PV2 can be varied as necessary in order to maintain the condition of zero algebraic sum of the constituent echoes of the echo array assembled by the transformer TR1. The motor M preferably is of low-inertia type.

A reference signal is obtained from the input terminal T1 and fed via a band-pass-filter BPF1 and an amplifier AMP1 to one input terminal of a phase sensitive detector PSD. The ends of the winding W2 also are connected via a band-pass-filter BPF2 and an amplifier AMP2 to a second input terminal of the detector PSD to provide an error-signal input for the detector. Since the D.C. component of the input to terminal T1 is not used in the derivation of the error or the reference signals, the amplifiers AMP1 and AMP2 can be A.C. amplifiers which readily provide high amplification free from drift. When applied to a television system as described above, and the error signal is derived from the line repetition frequency component of the television signal, the filters BPF1 and BPF2 have a fairly narrow pass band centred on the line repetition frequency. The pass band, however, is made sufficiently wide to prevent hunting of the servo system.

The phase-sensitive detector conveniently may be similar to that described with reference to FIGURE 3–20 on page 112 of "Theory of Servomechanisms" by James, Nichols and Phillips and published by McGraw-Hill in 1947. The detector PSD delivers a D.C. output whose magnitude and polarity depends on the magnitude of the error signal and the sense of the error signal relative to that of the reference signal. The output from the detector PSD is supplied to the motor M via a single stage D.C. coupled transistor amplifier AMP3 which provides a low output impedance.

If the servo-mechanism be required to operate fast, the usual precautions, such as error-rate damping may have to be incorporated.

As an alternative to using a variable attenuator PV2 to provide a "zero-time" echo signal, the equivalent of this signal may be derived from the main signal output. The essentials of such an arrangement are shown in FIG. 3, the remainder of the apparatus, apart from the servo-loop, being identical to that shown in FIG. 1 with the attenuator PV2 removed.

Figure 3:
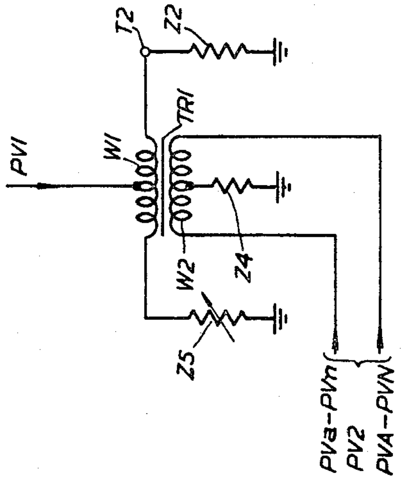
FIG. 3 shows a modification of part of FIG. 1.

In FIG. 3, a variable balancing impedance Z5 is connected to the winding W1 of the transformer T2 in place of the fixed impedance Z3. The impedance Z5 is shown as a variable resistor which may be a potentiometer one of whose ends is connected to the winding W1 and the slider of which is grounded. It is arranged that a balanced condition is obtained with the slider approximately midway between the ends of the resistor so that the main signal derived from the hybrid H produces no magnetisation of the core of the transformer TR1. Adjustment of the position of the slider results in an out-of-balance condition which produces a potential, of magnitude and polarity dependent upon the position of the slider, appearing across the winding W1 and hence across winding W2, of the transformer. This out-of-balance potential is derived from and is coincident in time with the main signal output and thus may be used to ensure that the algebraic sum of the echo signals is zero.

The arrangement shown in FIG. 3 may sometimes be convenient. However, the arrangement shown in FIG. 1 is preferred since it ensures that the zero-frequency loss of the apparatus is independent of the echo-pattern produced, which is of considerable value in practical operation of the apparatus. Further, with the FIG. 1 arrangement, the attenuator PV2 may conveniently be a potentiometer of relatively high resistance and the resolution of such a potentiometer would be higher than that of the variable balancing impedance Z5 of FIG. 3, which would have a relatively low impedance.

Further, other arrangements than that described may be used in order to obtain automatic control of the zero-time echo signal. For example, the error criterion might be derived from the difference in magnitude of the currents flowing into either end of the winding W2 of the transformer TR1. Again, in the system described, the reference signal may be obtained from other points in the main signal path than at the input terminal T1. The phase of the reference signal may be altered as desired but usually will be coincident with that of the zero-time echo signal.

It will be appreciated that although reduction to zero of D.C. magnetization of the core of transformer TR1 has been referred to in this specification, this necessarily implies also minimizing low frequency A.C. magnetisation of the core so that the advantages to be derived from the use of equipment in accordance with the invention are independent of whether or not the input signal contains a D.C. component.

It will be appreciated that whereas in the preceding description reference has been made to apparatus which produces echo or replica signals some of which are advanced in time and others retarded in time with respect to the main signal output, in certain cases both types of echo signals would not be required. For example, in correcting a video cable which does not incorporate equalizers, only echo or replica signals retarded with respect to the main signal output from the echo waveform apparatus would be required since the cable does not introduce any distortion ahead of the main signal.

I claim:

1. Electrical echo waveform corrector or synthesizer apparatus including transmission delay means, a signal input terminal for the transmission delay means, an output terminal, first means for deriving a main signal output from the signal input terminal and connected to apply the main signal output to the output terminal, second means for deriving from the transmission delay means desired amplitude replicas of the signal input non-coincident in time with the main signal output, a cored transformer connected to the output terminal, means for applying the said replicas to the transformer for combination with the main signal output, and third means for applying to the transformer a desired amplitude replica of the signal input coincident in time with the main signal output, the second means being adjustable to cause additive or subtractive combination at the output terminal of individual replicas with the main signal output, and the third means being adjustable to so vary the sense and amplitude of the replica coincident in time with the main signal output that the replica signals applied to the transformer by both the second and third means together produce zero direct current magnetisation of the transformer core.

2. Apparatus according to claim 1, in which the transmission delay means is a transmission delay device having the said second means coupled thereto for derivation of the replicas of the input signal non-coincident in time with the main signal output.

3. Apparatus according to claim 2, in which the first means is coupled to the delay device for deriving the main signal output therefrom.

4. Apparatus according to claim 1, in which the said second means is arranged for deriving replicas of the signal input retarded in time with respect to the main signal output.

5. Apparatus according to claim 1, in which the said second means is arranged for deriving both replicas of the signal input retarded in time with respect to the main signal output and replicas of the signal input advanced in time with respect to the main signal output.

6. Apparatus according to claim 1, including means coupled to the transmission delay means for deriving therefrom the replica of the input signal coincident in time with the main signal input and for applying the said coincident replica to the transformer.

7. Apparatus according to claim 1, in which the said second means is adjustable to vary the polarity sense of the replicas non-coincident in time with the main signal output.

8. Apparatus according to claim 1, including means automatically responsive to the algebraic sum of the replicas non-coincident in time with the main signal output and of the replica coincident in time with the main signal output to control the said third means in such manner that the sense and amplitude of the replicas coincident in time with the main signal output are so adjusted that the said algebraic sum becomes zero.

9. Apparatus according to claim 1, in which the said third means comprises a variable impedance for providing an unbalanced termination of the said cored transformer whereby the said main signal produces current flow in the transformer to provide said replica coincident in time with the main signal output.

10. Electrical echo waveform corrector or synthesiser apparatus including signal transmission delay means, a signal input terminal for the delay means, an output terminal, a cored transformer connected to the output terminal, first means comprising a variable attenuation device coupled to the delay means for deriving a main signal output from the signal input and connected to apply the main signal output to the transformer, second means comprising respective variable attenuation devices coupled to the delay means for deriving therefrom desired amplitude replicas of the signal input retarded in time with respect to the main signal output and desired amplitude replicas of the signal input advanced in time with respect to the main signal output, said attenuation devices comprising the said second means each being connected to the said transformer for applying the said replicas thereto for combination with the main signal output, the said attenuation devices comprising the second means each being capable of selectively applying a replica to the said transformer for additive or subtractive combination with the main signal output, and third means comprising a variable attenuation device coupled to the delay means for deriving therefrom a desired amplitude replica of the signal input coincident in time with the main signal output and connected to apply the coincident replica to the transformer for combination with the main signal output, the attenuator comprising the said third means being selectively adjustable to apply the said replica coincident in time with the main output to the transformer with such amplitude and sense with respect to the main signal output that the replicia signals applied to the transformer by the said second and third means together produce zero direct current magnetisation of the transformer core.

11. Apparatus according to claim 10, and including means for detecting the algebraic sum of the said replicas non-coincident in time with the main signal output and for generating a control signal when and for as long as the said algebraic sum differs from zero, means responsive to such control signal and operable thereby to adjust the said attenuator device comprising the third means in such manner that the algebraic sum of the said replicas non-coincident in time with, together with the said replica coincident in time with, the main signal output becomes zero.

References Cited by the Examiner

UNITED STATES PATENTS

| | | | |
|---|---|---|---|
| 2,760,164 | 8/1956 | Graham | 333—28 X |
| 2,790,956 | 4/1957 | Ketchledge | 333—70 X |
| 2,935,703 | 5/1960 | Linke | 333—20 |
| 3,181,089 | 4/1965 | Fujimoto | 333—29 X |

HERMAN KARL SAALBACH, *Primary Examiner.*

R. F. HUNT, JR., *Assistant Examiner.*